UNITED STATES PATENT OFFICE.

JULIUS LEWY, OF KÖNIGSBERG, PRUSSIA, GERMANY.

ARTIFICIAL WAX.

No. 802,169. Specification of Letters Patent. Patented Oct. 17, 1905.

Application filed February 1, 1905. Serial No. 243,638.

*To all whom it may concern:*

Be it known that I, JULIUS LEWY, a subject of the King of Prussia, German Emperor, and a resident of Königsberg, in the Kingdom of Prussia, German Empire, have invented new and useful Improvements in Artificial Wax, of which the following is a full, clear, and exact specification.

By my invention a naphthol, preferably beta-naphthol, is added to substances used in making artificial wax compositions destined, for instance, for the manufacture of candles, wax matches, wax flowers, and the like—such as paraffins or mixtures of paraffin with ceresins or stearin (a mixture of stearic acid and palmitic acid,) such as are used for making so-called "composite" candles. This addition has the effect of suppressing the more or less great transparency of paraffin and of the mixtures of paraffin with the compounds mentioned above, a fact particularly valuable in the manufacture of composite candles, imitated wax matches, wax flowers, and the like. If beta-naphthol is used, it will give to the mass the fine white color of good stearic acid, while alpha-naphthol being used the mass will often get a reddish appearance. The proportion of the addition may vary within wide limits, and the mixture is made at a temperature suitable to the nature of the materials used. The addition may be made either during the process of manufacture of the paraffin or to the final product and its mixtures. The naphthol is mixed with the other substances used while these are in a melted condition or when they are heated to a more elevated temperature.

Mixtures suitable for the production of candles are obtained by heating together while stirring the following substances up to eighty to ninety (80° to 90°) degrees centigrade.

Example 1: One hundred (100) parts of paraffin and two (2) parts of beta-naphthol.

Example 2: One hundred (100) parts of paraffin, five (5) parts of stearin, and two (2) parts of beta-naphthol.

Example 3: One hundred (100) parts of paraffin, three (3) parts of ceresin, and two (2) parts of beta-naphthol.

Example 4: One hundred (100) parts of paraffin, three (3) parts of stearin, two (2) parts of ceresin, and two (2) parts of beta-naphthol.

The candles obtained from these mixtures possess a good white color, contrary to, for instance, candles from pure paraffin, which latter have the well-known grayish transparent appearance.

It must be understood that instead of using sole paraffin or the mixture of paraffin and stearin, &c., coloring substances and such additions may be intermixed which are able to lower or raise to the melting-point of the mixture.

Having thus described my invention, I claim as new and desire to secure by Letters Patent—

1. As a new composition of matter the mixture containing paraffin and a naphthol, substantially as described.

2. As a new composition of matter a mixture containing paraffin, stearin and beta-naphthol, substantially as described.

3. As a new composition of matter the mixture containing paraffin, stearin and a naphthol, substantially as described.

4. As a new composition of matter the mixture containing paraffin, ceresin and a naphthol, substantially as described.

5. As a new composition of matter the mixture containing paraffin, stearin, ceresin and a naphthol, substantially as described.

In testimony that I claim the foregoing as my invention I have signed my name in presence of two subscribing witnesses.

JULIUS LEWY.

Witnesses:
  HENRY HASPER,
  WOLDEMAR HAUPT.